US012755718B2

(12) United States Patent
Wicks et al.

(10) Patent No.: US 12,755,718 B2
(45) Date of Patent: Oct. 6, 2026

(54) RENDERING OF FIELD SEQUENTIAL DISPLAYS IN A DISPLAY SUBSYSTEM

(71) Applicant: QUALCOMM Incorporated, San Diego, CA (US)

(72) Inventors: Jonathan Wicks, Lafayette, CO (US); Chun Wang, Markham (CA); Samuel Benjamin Holmes, Sterling, MA (US); Mark Sternberg, Toronto (CA); Prashant Nukala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 18/713,543

(22) PCT Filed: Dec. 15, 2022

(86) PCT No.: PCT/US2022/053062

§ 371 (c)(1),
(2) Date: May 24, 2024

(87) PCT Pub. No.: WO2023/146651

PCT Pub. Date: Aug. 3, 2023

(65) Prior Publication Data

US 2025/0022436 A1 Jan. 16, 2025

(30) Foreign Application Priority Data

Jan. 25, 2022 (IN) ............................ 202241004200

(51) Int. Cl.
*G09G 5/02* (2006.01)
*G09G 5/377* (2006.01)

(52) U.S. Cl.
CPC ............ *G09G 5/026* (2013.01); *G09G 5/377* (2013.01); *G09G 2310/0235* (2013.01)

(58) Field of Classification Search
CPC .................. G09G 5/026; G09G 5/377; G09G 2310/0235; G09G 2340/0407; G09G 3/20; G09G 2340/10
See application file for complete search history.

(56) References Cited

U.S. PATENT DOCUMENTS

| | | | | |
|---|---|---|---|---|
| 9,613,587 | B2 | 4/2017 | Halfman et al. | |
| 2001/0055081 | A1* | 12/2001 | Shigeta | G02F 1/133621 348/E9.027 |

(Continued)

FOREIGN PATENT DOCUMENTS

| | | | |
|---|---|---|---|
| AU | 2003270972 | A1 * | 1/2004 |
| WO | 2013180902 | A1 | 12/2013 |
| WO | 2021167372 | A2 | 8/2021 |

OTHER PUBLICATIONS

International Search Report and Written Opinion—PCT/US2022/053062—ISA/EPO—Feb. 28, 2023.

*Primary Examiner* — Haixia Du
(74) *Attorney, Agent, or Firm* — Procopio, Cory, Hargreaves & Savitch LLP

(57) ABSTRACT

Aspects presented herein relate to methods and devices for display processing including an apparatus, e.g., a DPU. The apparatus may obtain an indication of associated with a plurality of pixels corresponding to a plurality of color channels. The apparatus may also divide each of the plurality of color channels. The apparatus may also select at least one first color channel of the plurality of divided color channels. Further, the apparatus may scale each of the pixels associated with the at least one first color channel. The apparatus may also blend, based on each of the plurality of scaled pixels, all of the plurality of pixels associated with the at least one first color channel. The apparatus may also (Continued)

transmit, based on all of the plurality of blended pixels, an indication of the plurality of pixels associated with the at least one first color channel.

29 Claims, 10 Drawing Sheets

(56) References Cited

U.S. PATENT DOCUMENTS

| | | | | |
|---|---|---|---|---|
| 2010/0215280 | A1* | 8/2010 | Abdo | H04N 19/50 382/224 |
| 2019/0057491 | A1* | 2/2019 | Yang | G06T 5/77 |
| 2019/0180703 | A1 | 6/2019 | Yata et al. | |
| 2020/0356836 | A1* | 11/2020 | Hargil | G06N 3/045 |
| 2021/0314620 | A1* | 10/2021 | Matysik | G06F 3/147 |

* cited by examiner

RENDERING OF FIELD SEQUENTIAL DISPLAYS IN A DISPLAY SUBSYSTEM

CROSS REFERENCE TO RELATED APPLICATION(S)

This application is a National Stage Application filed under 35 U.S.C. § 371 of PCT International Application No. PCT/US2022/053062, entitled "RENDERING OF FIELD SEQUENTIAL DISPLAYS IN A DISPLAY SUBSYSTEM" and filed Dec. 15, 2022, which claims the benefit of and priority to Indian Provisional Patent Application No. 202241004200, entitled "RENDERING OF FIELD SEQUENTIAL DISPLAYS IN A DISPLAY SUBSYSTEM" and filed on Jan. 25, 2022, which are expressly incorporated by reference herein in their entirety.

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that may perform display processing. The apparatus may obtain an indication of color data associated with a plurality of pixels, where each of the plurality of pixels corresponds to a plurality of color channels, where each of the plurality of pixels is associated with a corresponding pixel position of a set of pixel positions. The apparatus may also write the color data associated with each of the plurality of pixels to a first memory or a cache after being configured to obtain the indication the color data associated with each of the plurality of pixels. Further, the apparatus may divide each of the plurality of color channels corresponding to each of the plurality of pixels. The apparatus may also select at least one first color channel of the plurality of divided color channels. The apparatus may also scale each of the plurality of pixels associated with the at least one first color channel. Moreover, the apparatus may blend, based on each of the plurality of scaled pixels, all of the plurality of pixels associated with the at least one first color channel. The apparatus may also transmit, based on all of the plurality of blended pixels, an indication of the plurality of pixels associated with the at least one first color channel. The apparatus may also store the indication of the plurality of pixels in a first memory, a first buffer, or a first cache.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
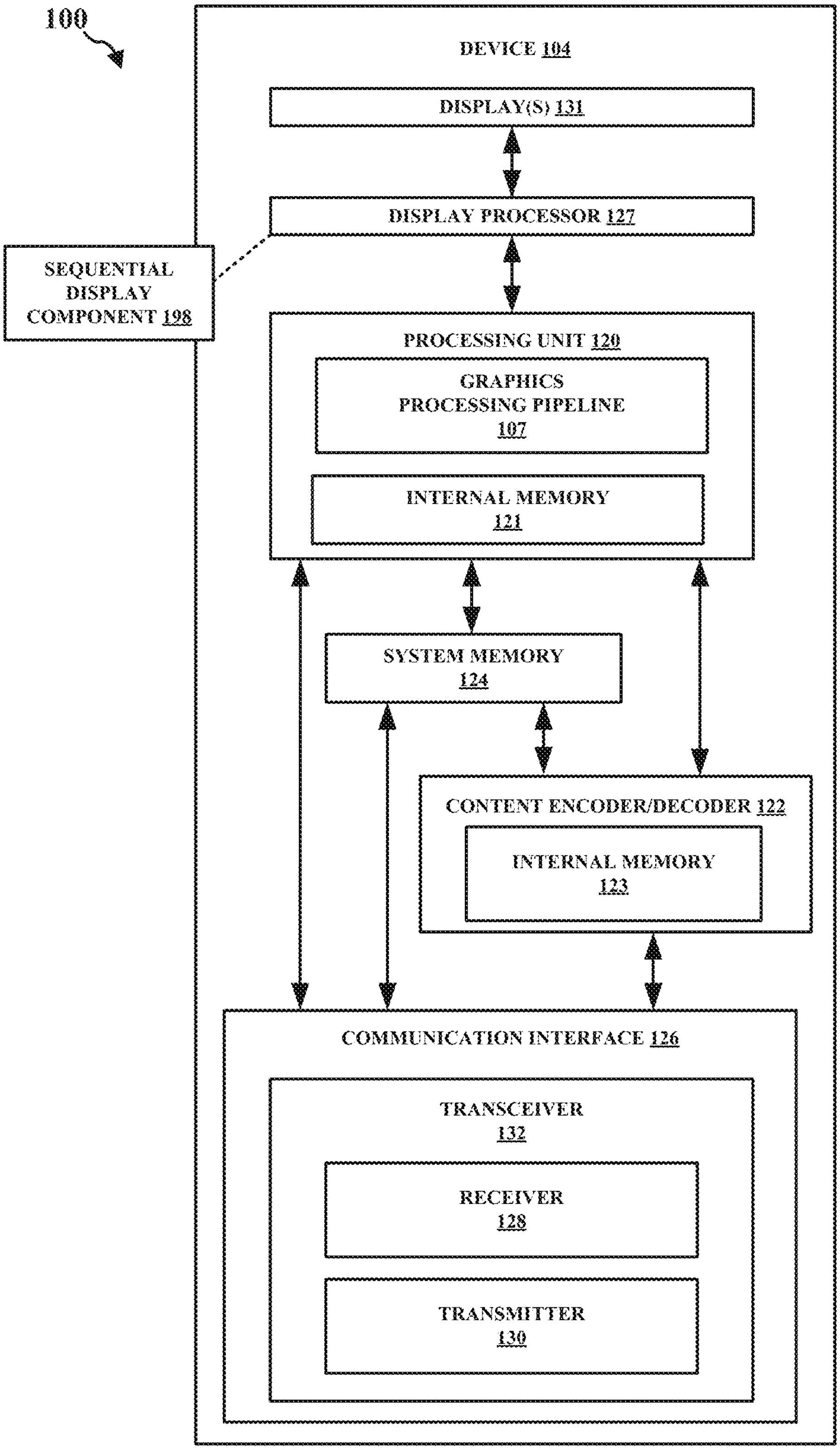
FIG. 1 is a block diagram that illustrates an example content generation system.

Consumer adoption of augmented reality (AR) devices may result in devices including a number of different factors. For example, consumer adoption of AR devices may result in devices including small sleek glasses-like form factors. Field sequential display (FSD) techniques including FSD panels may present primary color information in successive images and rely on the human eye to fuse the successive images into a color picture. Additionally, FSD panels may be a panel of choice for certain display techniques (e.g., augmented reality (AR), virtual reality (VR), mixed reality (MR), or extended reality (XR) techniques). This may be due to a number of characteristics of FSD panels, such as a small form factor, small pixel size, and/or high depth of focus. However, FSDs may necessitate that color data in an image be planarized (i.e., separate/divide the color data into individual color channels and/or write individual color channels for the color data). For example, FSDs may need a graphics processing unit (GPU) to planarize the color data (i.e., write individual color channels for the color data) in an image. Although GPUs may be optimized for certain types of rendering (e.g., red (R), green (G), blue (B), alpha (A) (RGBA) interleaved rendering), GPUs may be inefficient at planarizing interleaved color data. For example, GPUs may be inefficient at writing individual color channels (e.g., RRRR, GGGG, BBBB, AAAA) compared to writing all the color channels at once (e.g., RGBA, RGBA, RGBA). Aspects presented herein may use a GPU to render interleaved color data and utilize a display processing unit (DPU) to planarize the color data. That is, aspects presented herein may utilize a DPU to divide interleaved color data and/or perform the color channel separation for color data. For instance, after a GPU renders the color data, aspects of the present disclosure may utilize a DPU to divide the color data into individual color channels and/or write individual color channels for the color data. In some instances, a GPU may provide an interleave buffer, while the DPU hardware may separating the color channels and format the color data for the display panel. For example, aspects presented herein may allow the GPU to render or provide the interleaved color data, which is an efficient use of the GPU. After the GPU renders the interleaved color data, aspects presented herein may utilize a DPU to divide the interleaved color and perform the color channel separation. Indeed, aspects presented herein planarize each of the color channels at the DPU, which is much more efficient than doing so at the GPU. By planarizing each of the color channels at the DPU, aspects presented herein may increase the overall performance of the GPU, as well as save on power at the GPU. In some instances, aspects of the present disclosure may configure display processor hardware (e.g., DPU hardware) to isolate specific color channels from the GPU-rendered color content (e.g., RGBA content). For instance, the display processor hardware may scan out the color channels to a panel (e.g., a field sequential display (FSD) panel) at appropriate times. Moreover, as all GPU rendering may already pass through the display processor to be scanned out to the FSD panel, aspects presented herein may enable the GPU to continue efficiently rendering. For instance, aspects presented herein may allow a GPU to continue efficiently rendering color data (e.g., render data to RGBA content) while utilizing certain aspects of a DPU that may typically be unused. For example, aspects of the present disclosure may utilize a GPU to render data to RGBA content and utilize silicon in the DPU, which may typically be unused during FSD configurations.

Aspects of the present disclosure may include a number of benefits or advantages. For instance, aspects of the present disclosure may reduce GPU composition time, which may provide more time for content rendering. Aspects presented herein may also save memory bandwidth at a GPU and/or a DPU, as well as increase the overall performance at a GPU and/or a DPU. Further, aspects presented herein may be fully compatible with an existing augmented reality (AR) data flow. Aspects of the present disclosure may also utilize existing hardware that is part of the DPU, which may otherwise not be used in a field sequential display configuration. Moreover, aspects presented herein may include scalable aspects, where different options may depend on different factors (e.g., chip tier, panel resolution, and/or framerate).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a sequential display component 198 configured to obtain an indication of color data associated with a plurality of pixels, where each of the plurality of pixels corresponds to a plurality of color channels, where each of the plurality of pixels is associated with a corresponding pixel position of a set of pixel positions. The sequential display component 198 may also be configured to write the color data associated with each of the plurality of pixels to a first memory or a cache after being configured to obtain the indication the color data associated with each of the plurality of pixels. The sequential display component 198 may also be configured to divide each of the plurality of color channels corresponding to each of the plurality of pixels. The sequential display component 198 may also be configured to select at least one first color channel of the plurality of divided color channels. The sequential display component 198 may also be configured to scale each of the plurality of pixels associated with the at least one first color channel. The sequential display component 198 may also be configured to blend, based on each of the plurality of scaled pixels, all of the plurality of pixels associated with the at least one first color channel. The sequential display component 198 may also be configured to transmit, based on all of the plurality of blended pixels, an indication of the plurality of pixels associated with the at least one first color channel. The sequential display component 198 may also be configured to store the indication of the plurality of pixels in a first memory, a first buffer, or a first cache. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
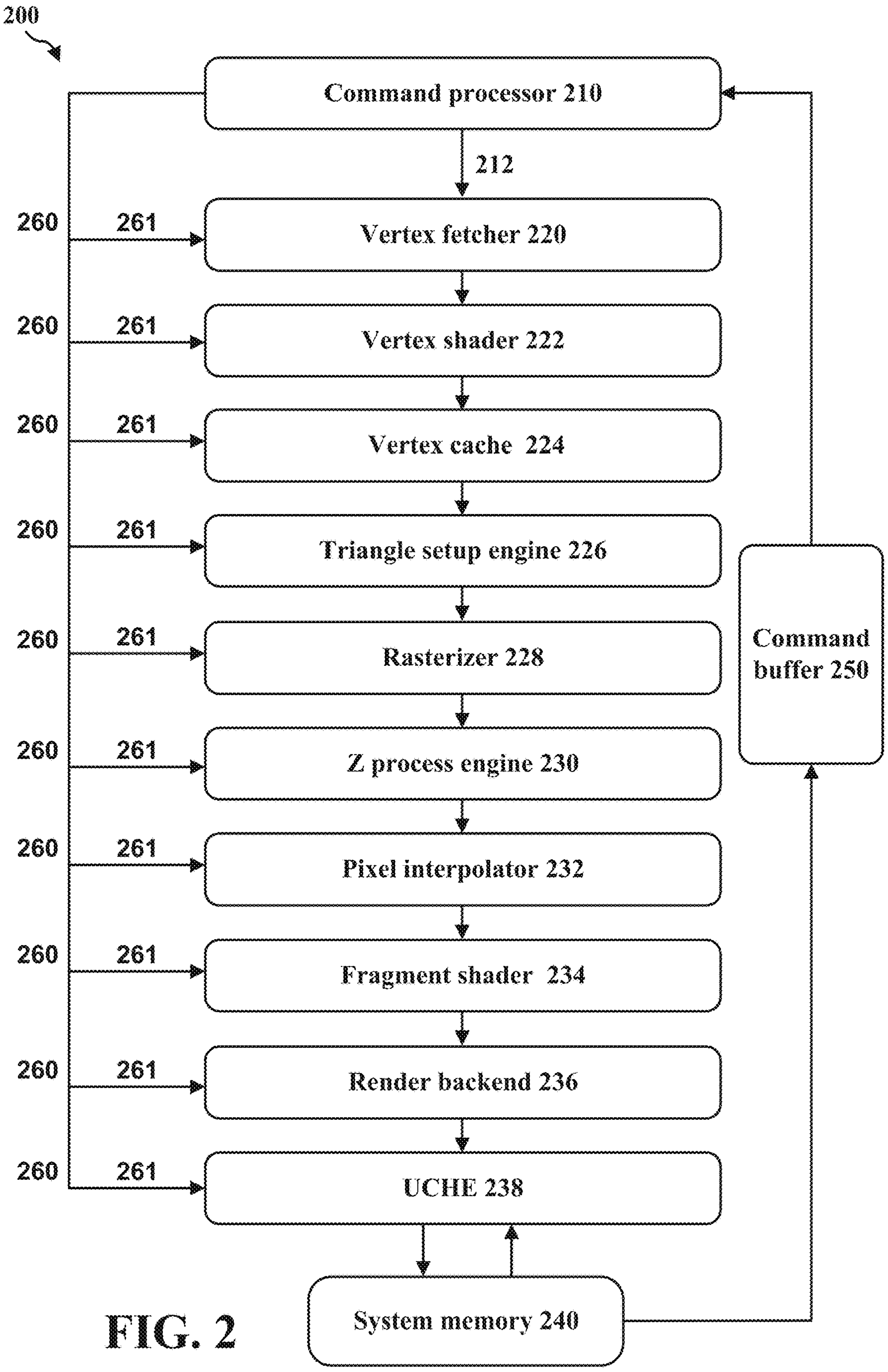
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
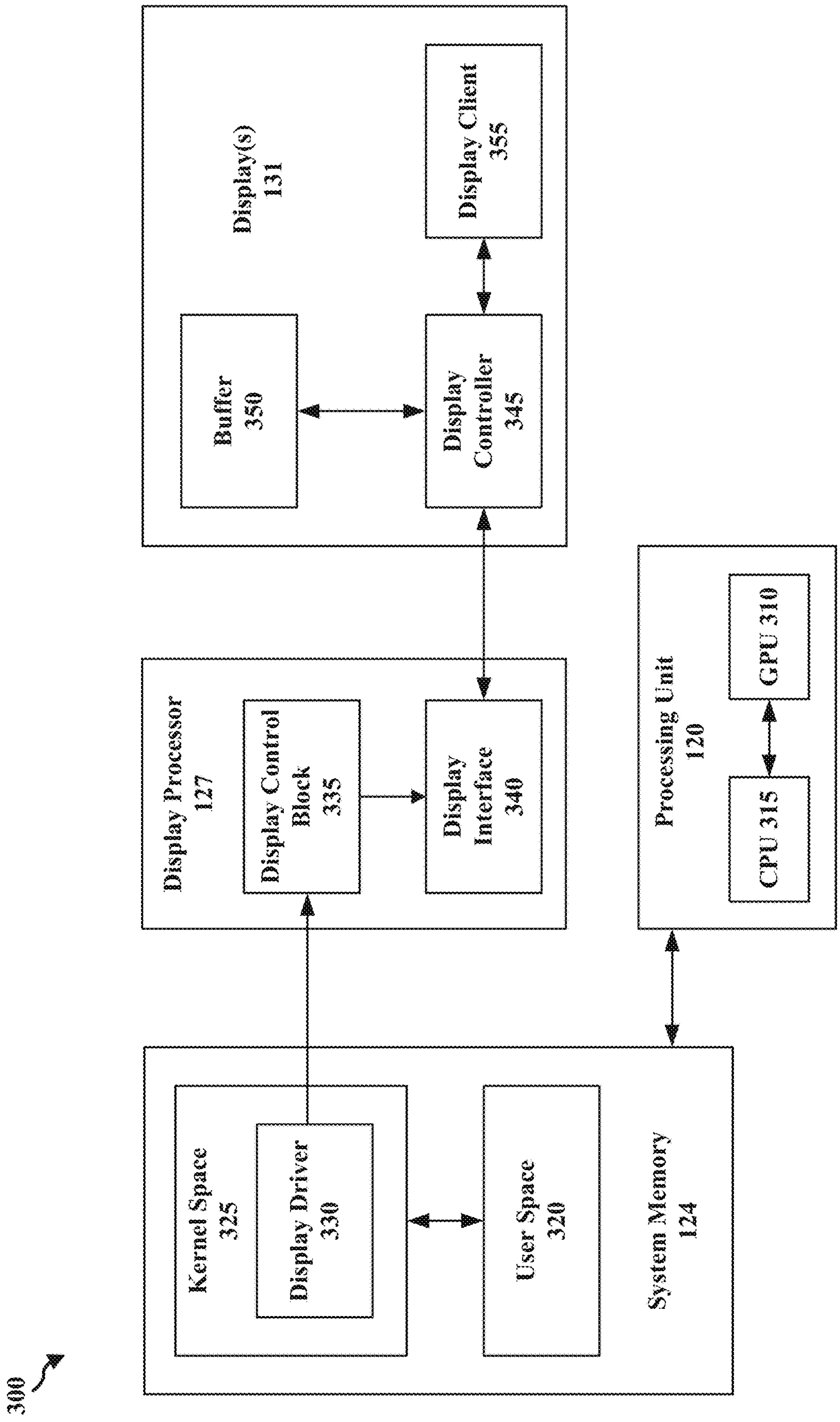
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the exemplary device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display (s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display (s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize frame buffers to cache or store a composition output of a GPU. For instance, display layers may be cached or stored in a frame buffer after composition at a GPU. In some aspects, a composition hardware (HW) or software (SW) stack may use a frame buffer target to cache a composition output (e.g., a GPU composition output or a CPU composition output). The cached composition output may then be sent to another processor (e.g., a DPU) as an input layer. The frame buffer may have a number of different color formats, such as a red (R) green (G) blue (B) alpha (A) (RGBA) format (e.g., RGBA8888 format). Also, the frame buffer may be a certain size, (e.g., a 32-bit triple buffer). For example, at the beginning of a display/graphics subsystem design, a frame buffer may be created as an RGBA8888 format and a 32-bit triple buffer. In some instances, if the frame layers do not use a certain composition (e.g., a GPU or client composition), the frame buffers may be ignored. Also, the layers (e.g., frame layers or display layers associated with display processing) may be directly fetched and composed. For instance, a DPU or hardware composer may directly fetch the layers and then compose the layers.

Some types of display processing devices (e.g., mobile devices, computers, TVs, or other consumer devices) may utilize complex multiple content layouts in a single display processing layer or multiple display processing layers. That is, for graphics or display stacks in operating systems of the devices, there may be a single display processing layer (i.e., display layer or layer that is associated with display processing) or multiple display processing layers. For instance, there may be at least one display layer that may be associated with a screen or frame for a display processing device, such that the display panel at the device may be divided amongst the display layers. Additionally, for content or end users, there may be multiple content entities in the display processing layer. This may be due to operating system limitations and/or application rendering/resource management limitations. Further, some types of applications may choose to render in using a single display processing layer. Color processing capability on a per-region basis (i.e., for each region of interest (ROI) in a layer) may be utilized with certain types of display processing unit (DPU) architecture.

Display processing may be performed for a number of different types of applications (e.g., virtual reality (VR) applications, augmented reality (AR) applications, mixed reality (MR) applications, and/or extended reality (XR) applications). In VR applications, the content displayed at a user device may correspond to man-made or animated content (e.g., content rendered at a server or user device). In AR, MR, or XR content, a portion of the content displayed at the user device may correspond to real-world content (e.g., objects in the real world), and a portion of the content can be man-made or animated content. Additionally, the man-made or animated content and real-world content may be displayed in an optical see-through or a video see-through device, such that the user can view real-world objects and man-made or animated content simultaneously. In some aspects, man-made or animated content can be referred to as augmented content, or vice versa.

Some types of display processing may utilize field sequential display (FSD), which is a display technique that presents primary color information in successive images and relies on the human eye to fuse the successive images into a color picture. For example, rather than using a uniform white backlight, field sequential displays, also referred to as field sequential color (FSC) displays or color sequential displays, may pulse between backlight colors (e.g., three backlight colors, such as red (R), green (G), and blue (B)) quickly to create an image. Although field sequential displays may utilize a high refresh rate, these types of displays include a number of benefits, such as power saving, increased display resolution, and/or improved contrast ratio. For example, field sequential displays may be beneficial for outdoor displays and displays where battery life savings is important.

Figure 4B:
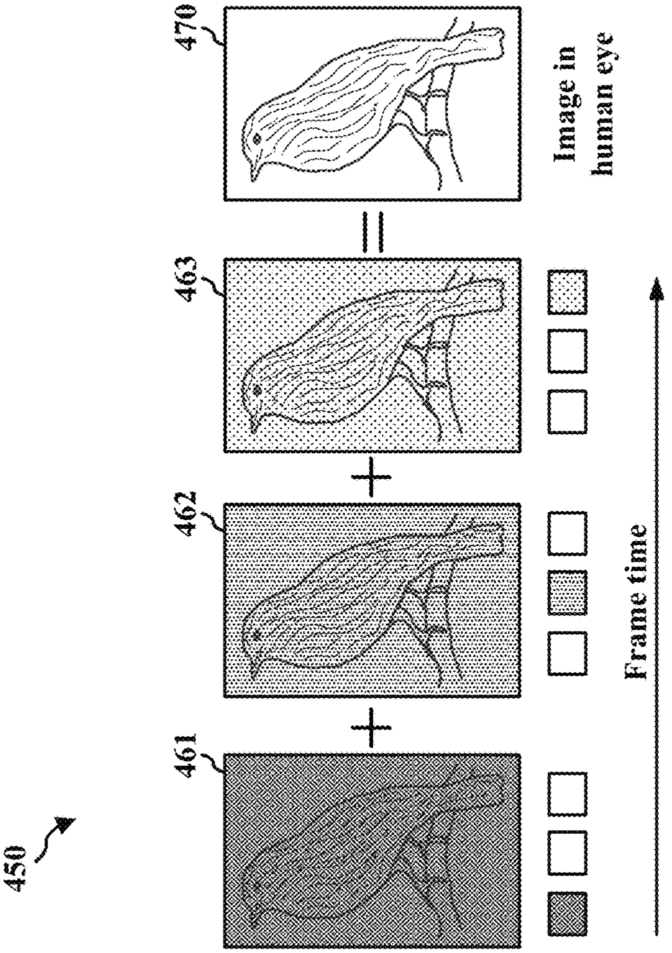
FIG. 4B is a diagram illustrating an example field sequential display (FSD) technique for display processing.
Figure 4A:
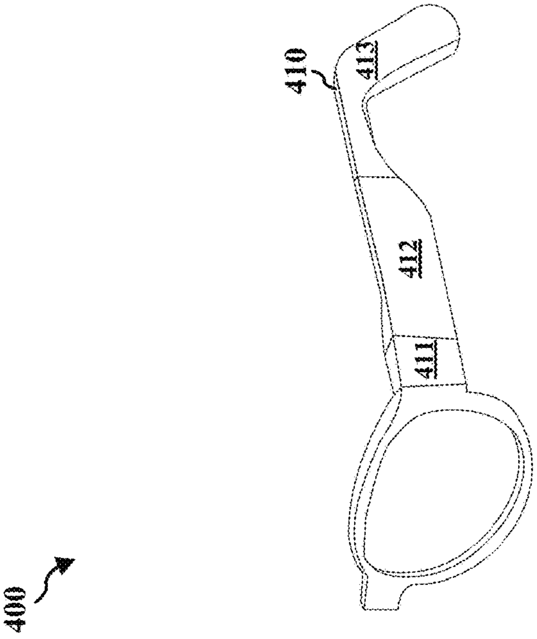
FIG. 4A is a diagram illustrating an example augmented reality (AR) device for display processing.

FIG. 4A is a diagram 400 illustrating an example augmented reality (AR) device for display processing. As shown in FIG. 4A, consumer adoption of AR devices may result in devices including a number of different factors. For instance, as depicted in diagram 400 in FIG. 4A, consumer adoption of AR devices may result in devices (e.g., device 410) including glasses-like form factors. For example, device 410 in FIG. 4A includes different sections (e.g., section 411, section 412, and section 413) that correspond to the glasses-like form factors. The device 410 may be an augmented reality (AR) device, a virtual reality (VR) device, a mixed reality (MR) device, and/or an extended reality (XR) device. Further, device 410 may be an AR device that utilizes field sequential display (FSD) techniques.

FIG. 4B is a diagram 450 illustrating an example field sequential display (FSD) technique for display processing. Diagram 450 includes several monochromatic images (e.g., image 461, image 462, and image 463) and a color image 470 (i.e., an image for the human eye). For example, image 461 may correspond to a red (R) backlight image, image 462 may correspond to a green (G) backlight image, and image 463 may correspond to a blue (B) backlight image. In FSD techniques, the images 461-463 may pulse between backlight colors (e.g., red (R), green (G), and blue (B)) quickly to create color image 470. As depicted in FIG. 4B, FSD techniques including FSD panels may present primary color information in successive, separate images (e.g., image 461, image 462, and image 463) and rely on the human eye to fuse the successive images into a color picture (e.g., color image 470).

Additionally, FSD panels may be a panel of choice for certain display techniques (e.g., AR, VR, MR, or XR techniques). This may be due to a number of characteristics of FSD panels, such as a small form factor, small pixel size, and/or high depth of focus. However, FSDs may necessitate that color data in an image be planarized (i.e., separate/divide the color data into individual color channels and/or write individual color channels for the color data). For example, FSDs may need a graphics processing unit (GPU) to planarize the color data (i.e., write individual color channels for the color data) in an image. Although GPUs may be optimized for certain types of rendering (e.g., red (R), green (G), blue (B), alpha (A) (RGBA) interleaved rendering), GPUs may be inefficient at planarizing interleaved color data. For example, GPUs may be inefficient at writing individual color channels (e.g., RRRR, GGGG, BBBB, AAAA) compared to writing all the color channels at once (e.g., RGBA, RGBA, RGBA). Based on this, it may be beneficial to use a GPU to render interleaved color data and utilize another processor to planarize the color data.

Aspects presented herein may use a GPU to render interleaved color data and utilize a display processing unit (DPU) to planarize the color data. That is, aspects presented herein may utilize a DPU to divide interleaved color data and/or perform the color channel separation for color data. For instance, after a GPU renders the color data, aspects of the present disclosure may utilize a DPU to divide the color data into individual color channels and/or write (i.e., enter data for) individual color channels for the color data. In some instances, a GPU may provide an interleave buffer, while the DPU hardware may separating the color channels and format the color data for the display panel. For example, aspects presented herein may allow the GPU to render or provide the interleaved color data, which is an efficient use of the GPU. After the GPU renders the interleaved color data, aspects presented herein may utilize a DPU to divide the interleaved color and perform the color channel separation. Indeed, aspects presented herein planarize each of the color channels at the DPU, which is much more efficient than doing so at the GPU. By planarizing each of the color channels at the DPU, aspects presented herein may increase the overall performance of the GPU, as well as save on power at the GPU.

In some instances, aspects of the present disclosure may configure display processor hardware (e.g., DPU hardware) to isolate specific color channels from the GPU-rendered color content (e.g., RGBA content). For instance, the display processor hardware may scan out the color channels to a panel (e.g., a field sequential display (FSD) panel) at appropriate times. Moreover, as all GPU rendering may already pass through the display processor to be scanned out to the FSD panel, aspects presented herein may enable the GPU to continue efficiently rendering. For instance, aspects presented herein may allow a GPU to continue efficiently rendering color data (e.g., render data to RGBA content) while utilizing certain aspects of a DPU that may typically be unused. For example, aspects of the present disclosure may utilize a GPU to render data to RGBA content and utilize silicon in the DPU, which may typically be unused during FSD configurations.

Figure 5:
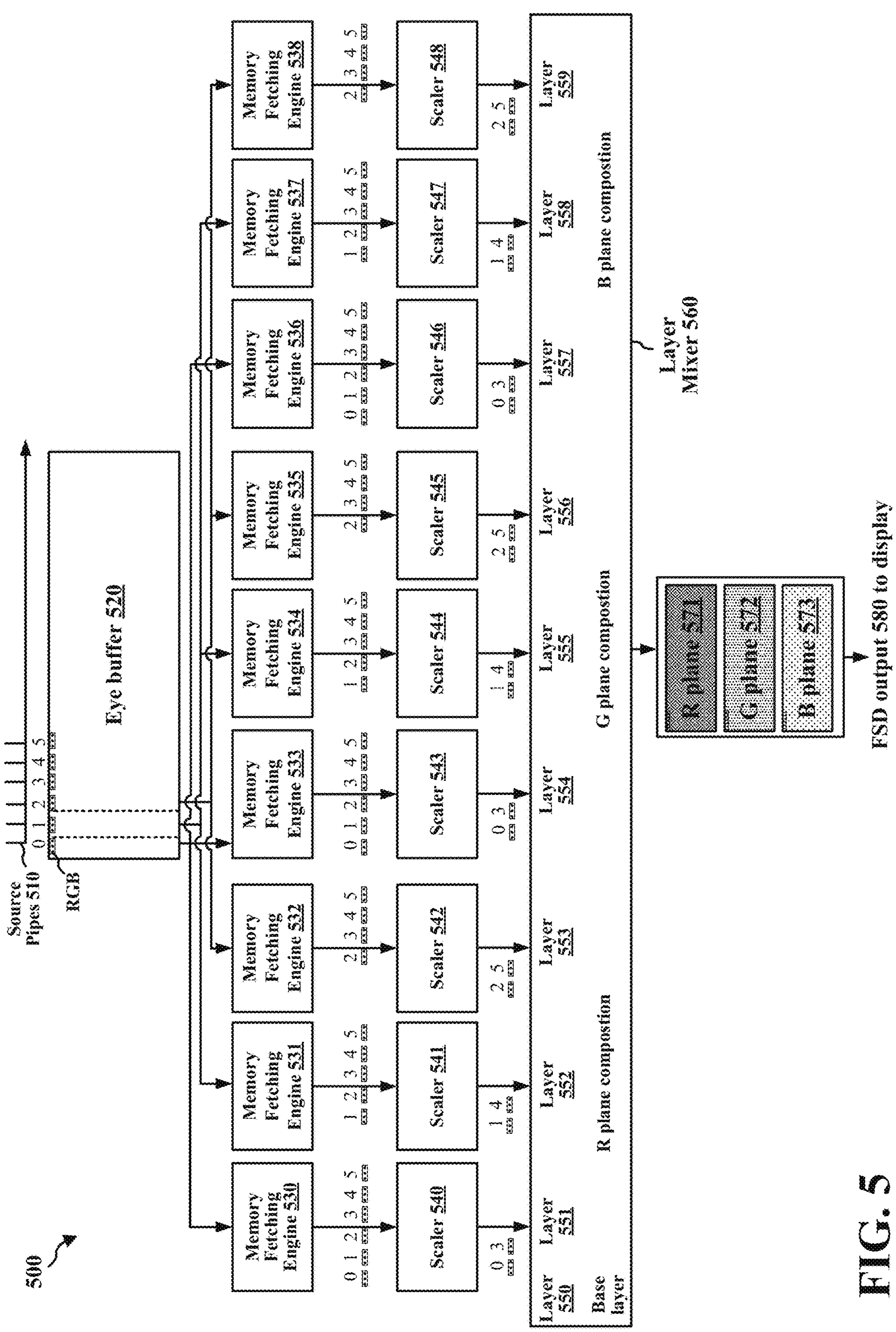
FIG. 5 is a diagram illustrating an example architecture for display processing.

FIG. 5 is a diagram 500 illustrating an example architecture for display processing. More specifically, diagram 500 depicts an inline conversion of color components (e.g., 3 color components per eye and/or per clock). As shown in FIG. 5, diagram 500 includes source pipes 510 (e.g., source pipe 1, source pipe 2, source pipe 3, source pipe 4, and source pipe 5), eye buffer 520, and a number of memory fetching engines (e.g., memory fetching engine 530, memory fetching engine 531, memory fetching engine 532, memory fetching engine 533, memory fetching engine 534, memory fetching engine 535, memory fetching engine 536, memory fetching engine 537, memory fetching engine 538). Diagram 500 also includes a number of scalers (e.g., scaler 540, scaler 541, scaler 542, scaler 543, scaler 544, scaler 545, scaler 546, scaler 547, and scaler 548), a number of different layers (e.g., layer 550, layer 551, layer 552, layer 553, layer 554, layer 555, layer 556, layer 557, layer 558, and layer 559), a layer mixer 560, a number of color channels/planes (e.g., R plane 571, G plane 572, and B plane 573), and an FSD output 580.

As shown in FIG. 5, the eye buffer 520 may store color data (e.g., interleaved color data). The memory fetching engines (e.g., memory fetching engines 530-538) may separate the color data channels. The scalers (e.g., scalers 540-548) may perform the scaling (i.e., downscaling or upscaling) of the color data. The layer mixer 560 may blend the color data. Further, layer 550 may be a base layer, layers 551-553 may correspond to an R plane composition, layers 554-556 may correspond to a G plane composition, and layers 557-559 may correspond to a B plane composition. Also, the FSD output 580 may be a planarized field sequential output. Each of the aforementioned components in FIG. 5 may help to convert from one color data format to another color data format. FIG. 5 further displays that there may be three scaling source pipes (e.g., source pipes 510) for each color plane. As shown in FIG. 5, each source pipe source rectangle may have a source offset by 1 pixel between them. For example, source pipe 1 (in source pipes 510) may take the R color and unpack to the R channel (e.g., R plane 571). Also, source pipe 2 (in source pipes 510) may take the R color and unpack to the G channel (e.g., G plane 572). Further, source pipe 3 (in source pipes 510) may take the R color and unpack to the B channel (e.g., B plane 573). Moreover, each source pipe in source pipes 510 may perform downscaling (e.g., downscaling by a factor of 2 or 3) using a drop pixel method. In some aspects, this may be achieved using a horizontal bilinear mode of scaling.

In some aspects, as shown in FIG. 5, a layer mixer composition of three source channels together may form a single layer that has a final output pixel (e.g., output pixel Rn, output pixel Rn+1, or output pixel Rn+2) for each pixel. In some instances, this may be a desired FSD output format at FSD output 580. In order to obtain a three color field, the above process may be repeated multiple times (e.g., two more times). On a second time, the G color may be unpacked to the R channel (e.g., R plane 571). On a third time, the B color may be unpacked to the R channel (e.g., R plane 571), etc. The three color fields may be composed by a layer mixer (e.g., layer mixer 560) into a single plane with the R field, the G field, and the B field in sequence. In some instances, each eye of a display device may utilize 9 scaling pipes, so a display device with two eyes may utilize 18 scaling pipes.

Figure 6:
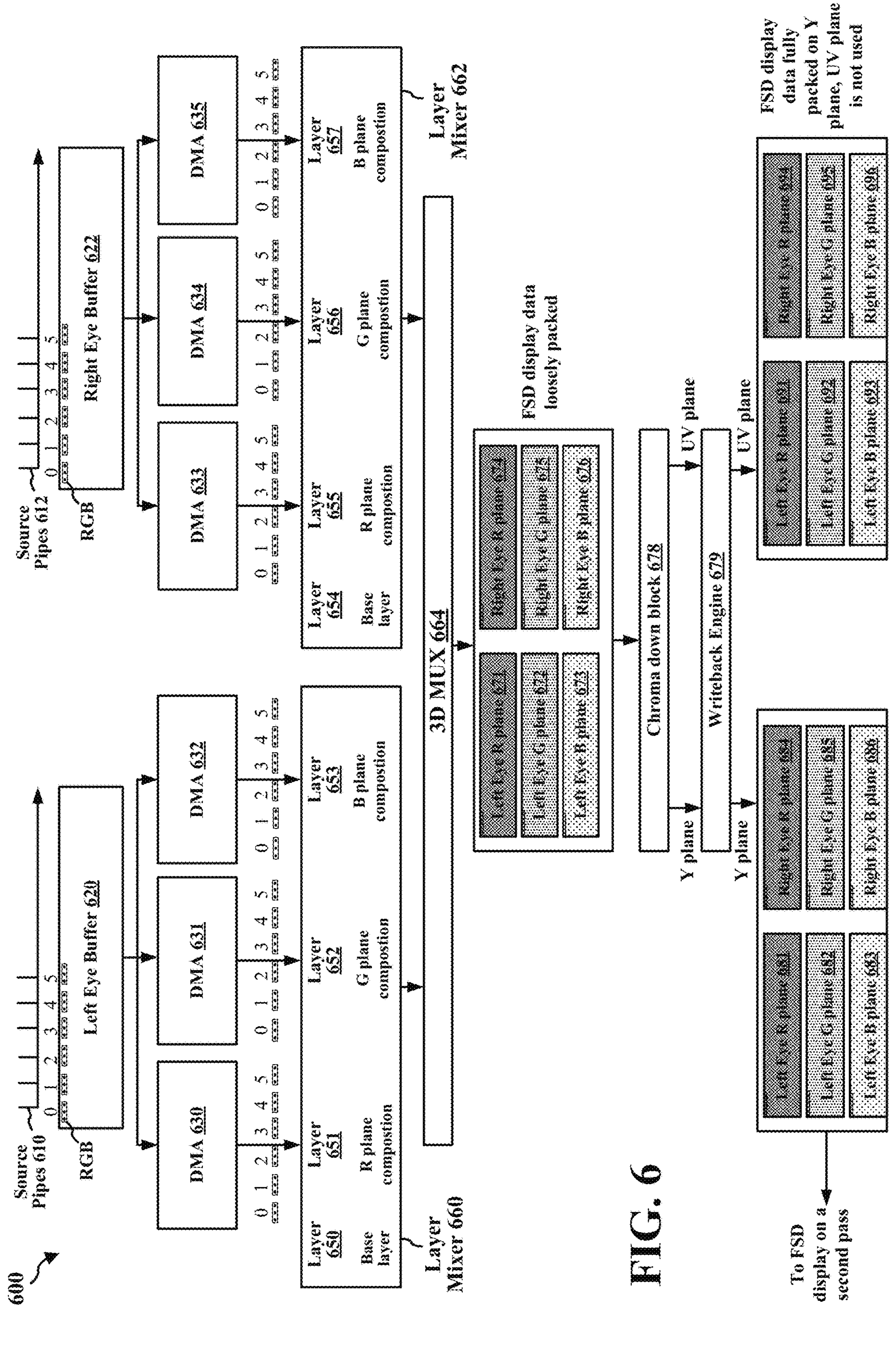
FIG. 6 is a diagram illustrating an example architecture for display processing.

FIG. 6 is a diagram 600 illustrating an example architecture for display processing. More specifically, diagram 600 in FIG. 6 depicts an offline conversion of color components (e.g., one color component per eye and/or per clock). As shown in FIG. 6, diagram 600 includes source pipes 610 (including source pipe 1, source pipe 2, source pipe 3, source pipe 4, and source pipe 5), source pipes 612 (including source pipe 1, source pipe 2, source pipe 3, source pipe 4, and source pipe 5), left eye buffer 620, right eye buffer 622, and a number of direct memory access (DMA) components (e.g., DMA 630, DMA 631, DMA 632, DMA 633, DMA 634, and DMA 635). Diagram 600 also includes a number of different layers (e.g., layer 650, layer 651, layer 652, layer 653, layer 654, layer 655, layer 656, and layer 657), layer mixer 660, layer mixer 662, a three-dimensional (3D) multiplexer (MUX) (e.g., 3D MUX 664), a number of color channels/planes (e.g., left eye R plane 671, left eye G plane 672, left eye B plane 673, right eye R plane 674, right eye G plane 675, right eye B plane 676), chrominance downscale (chroma down) block (e.g., chroma down block 678), writeback engine 679, and further color channels/planes (e.g., left eye R plane 681, left eye G plane 682, left eye B plane 683, right eye R plane 684, right eye G plane 685, right eye B plane 686, left eye R plane 691, left eye G plane 692, left eye B plane 693, right eye R plane 694, right eye G plane 695, and right eye B plane 696).

As shown in FIG. 6, the left eye buffer 620 and right eye buffer 622 may store color data (e.g., interleaved color data). The DMAs (e.g., DMAs 630-635) may separate the color data channels. The layer mixer 660 and layer mixer 662 may blend the color data. Further, layer 650 and layer 654 may be a base layer, layer 651 and layer 655 may correspond to an R plane composition, layer 652 and layer 656 may correspond to a G plane composition, and layer 653 and layer 657 may correspond to a B plane composition. The chroma down block 678 may separate the color channels to different color planes (e.g., a color packing unit that packs the color planes from loosely-packed planes to tightly-packed planes). Further, the writeback engine 679 may write back the converted data to memory (e.g., there may be two passes to use a reduced amount of hardware—the first pass planarizes and writes back to memory, while the second pass transmits to a display panel). FIG. 6 also shows the use of a luminance (Y) chrominance (UV) (YUV) plane. Also, the FSD output may be a planarized field sequential output. Each of the aforementioned components in FIG. 6 may help to convert from one color data format to another color data format.

FIG. 6 displays that each color plane may utilize one source pipe. Each eye buffer (e.g., left eye buffer 620 and right eye buffer 622) may use one of the source rectangles of a source pipe (in source pipes 610 and source pipes 612), such that two source rectangles within each source pipe may cover both eyes of a user. In some aspects, the source pipe may unpack the R color to the R channel. Two layer mixers may be used (e.g., layer mixer 660 and layer mixer 662), where each layer mixer may connect to one source pipe rectangle to allow parallel operation of two eyes at the same time. In some aspects, a chrominance downscale block (e.g., chroma down block 678) may be used to separate the color planes and a color space converter (CSC) may be used at chroma down block 678 to map the R channel to the luminance (Y) output of a luminance (Y) chrominance (UV) (YUV) color space. Additionally, a writeback engine 679 may be used to perform a write out operation, as a certain color format (e.g., NV12 format) and the R channel may be on the Y plane. In some aspects, the UV plane may contain nothing and the UV plane write out may not be used. In order to obtain a three color field, the above process may be repeated multiple times (e.g., two more times). On a second time, the G color may be unpacked to the R channel. On a third time, the B color may be unpacked to the R channel. The three color field may be composed by a layer mixer (e.g., layer mixer 660 and layer mixer 662) into a single plane before sending it to chroma down block 678 and writeback engine 679. Moreover, in some instances, the total number of source pipes utilized in FIG. 6 may be three.

Figure 7:
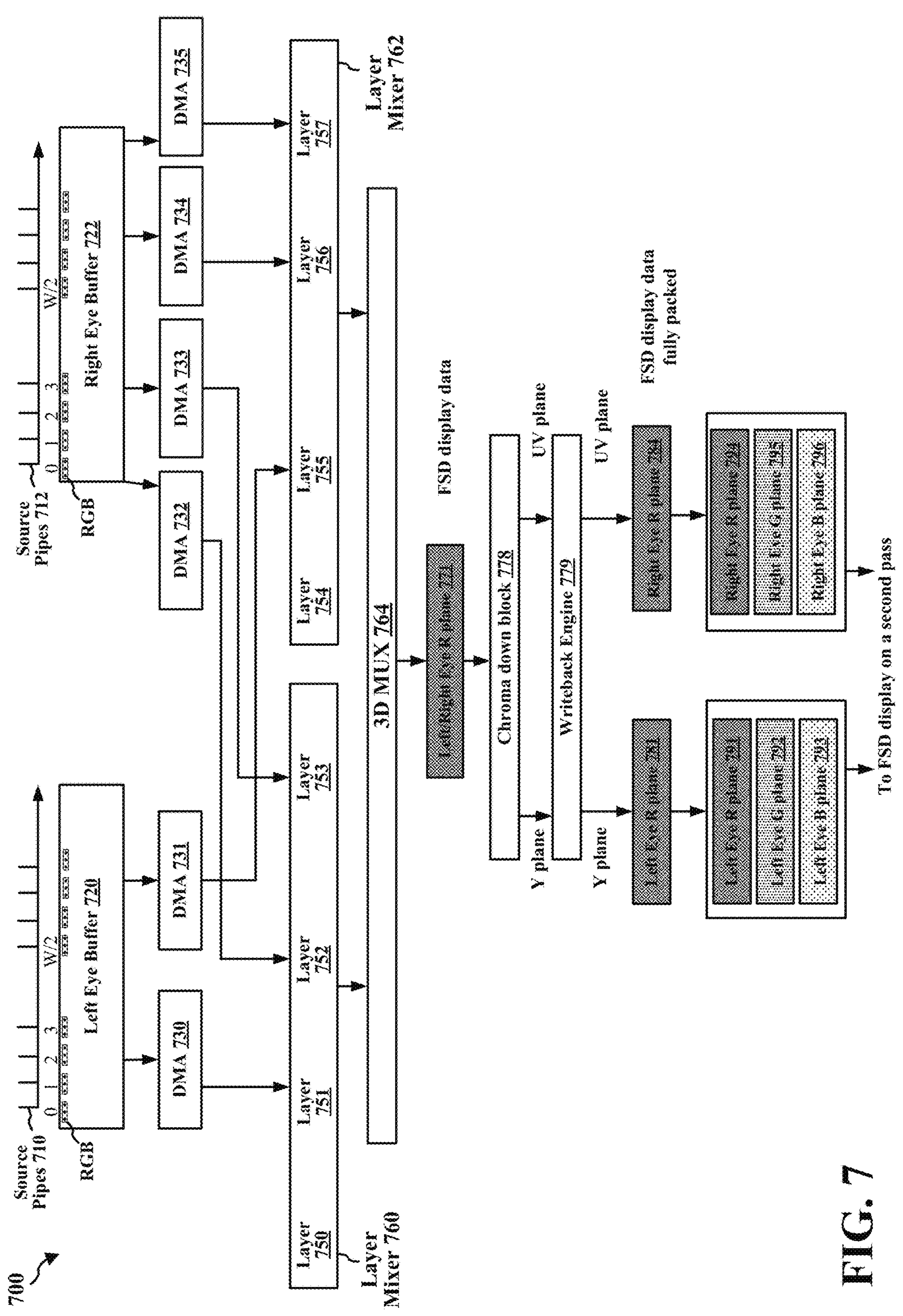
FIG. 7 is a diagram illustrating an example architecture for display processing.

FIG. 7 is a diagram 700 illustrating an example architecture for display processing. More specifically, diagram 700 in FIG. 7 depicts an offline conversion of color components (e.g., two color component per eye and/or per clock). As shown in FIG. 7, diagram 700 includes source pipes 710 (including source pipe 1, source pipe 2, source pipe 3, and source pipe W/2), source pipes 712 (including source pipe 1, source pipe 2, source pipe 3, and source pipe W/2), left eye buffer 720, right eye buffer 722, and a number of direct memory access (DMA) components (e.g., DMA 730, DMA 731, DMA 732, DMA 733, DMA 734, and DMA 735). Diagram 700 also includes a number of different layers (e.g., layer 750, layer 751, layer 752, layer 753, layer 754, layer 755, layer 756, and layer 757), layer mixer 760, layer mixer 762, a three-dimensional (3D) multiplexer (MUX) (e.g., 3D MUX 764), a color channel/plane (e.g., left eye R plane 771), chrominance downscale (chroma down) block (e.g., chroma down block 778), writeback engine 779, and further color channels/planes (e.g., left eye R plane 781, right eye R plane 784, left eye R plane 791, left eye G plane 792, left eye B plane 793, right eye R plane 794, right eye G plane 795, and right eye B plane 796).

As shown in FIG. 7, the left eye buffer 720 and right eye buffer 722 may store color data (e.g., interleaved color data). The DMAs (e.g., DMAs 730-735) may separate the color data channels. The layer mixer 760 and layer mixer 762 may blend the color data. Further, layer 750 and layer 754 may be a base layer, layer 751 and layer 755 may correspond to an R plane composition, layer 752 and layer 756 may correspond to a G plane composition, and layer 753 and layer 757 may correspond to a B plane composition. The chroma down block 778 may separate the color channels to different color planes (e.g., a color packing unit that packs the color planes from loosely-packed planes to tightly-packed planes). Further, the writeback engine 779 may write back the converted data to memory (e.g., there may be two passes to use a reduced amount of hardware—the first pass planarizes and writes back to memory, while the second pass transmits to a display panel). FIG. 7 also shows the use of a luminance (Y) chrominance (UV) (YUV) plane. Also, the FSD output may be a planarized field sequential output. Each of the aforementioned components in FIG. 7 may help to convert from one color data format to another color data format. FIG. 7 is similar to FIG. 6, but it focuses on a single color at a time. As such, one color (e.g., red) may be output faster in FIG. 7 compared to FIG. 6, as other colors are not being processed simultaneously.

FIG. 7 depicts that left eye buffer 720 may use a single source pipe. Also, the left eye buffer 720 may use two rectangles to fetch half of source image by each fetching a rectangle to obtain a two pixel per clock throughput. The source pipe may also unpack the R color to the R channel. The right eye buffer 722 may use two source pipes to fetch the right eye image. Further, the second source pipe may fetch the same image with one pixel offset horizontally. The right eye source pipe may use two rectangles of each pipe to fetch the image to obtain a two pixel per clock throughput with two pipes fetching the same image, which may result in a certain pixel per clock throughput (e.g., a four pixel per clock throughput). One right eye source pipe (e.g., source pipe 1 in source pipes 712) may unpack to the G color channel and another right eye source pipe (e.g., source pipe 2 in source pipes 712) may unpack to the B color channel. Additionally, two layer mixers (e.g., layer mixer 760 for the left half of the image and layer mixer 762 for the right half of the image) may be used to compose the three color component together. For example, R may be left eye Rn, G may be right eye Rn, and B may be right eye Rn+1.

In some aspects, chroma down block 778 may be used to separate the color into two planes. The color space converter (CSC) in chroma down block 778 may be setup to map the R channel to the Y output, which is the left eye color field. The CSC in chroma down block 778 may also map the G channel to the U output and the B channel to the V output, where U and V may both combine to form the right eye color field. As chroma down block 778 may perform a down scaling (e.g., a 2:1 or 3:1 down scaling) on UV, the output on the UV may be a right eye color component (e.g., n, n+1 color component), which may be a suitable or desired format. Writeback engine 779 may be used to write out in a certain color format (e.g., NV12 format), where the Y plane may contain the left eye color field and the UV plane may contain the right eye color field. In order to obtain a three color field, the above process may be repeated multiple times (e.g., two more times). On a second time, the G color component may be unpacked to the same channel as the first pass. On a third time, the B color component may be unpacked to the same color channel as the first pass. The layer mixers (e.g., layer mixer 760 and layer mixer 762) may be used to put the three color field into a single plane with vertical separation. In some instances, a total of three source pipes may be utilized for each color field, such that nine source pipes may be utilized to finish the three color field in a single pass. In some aspects, after the process shown in FIG. 7, all the colors may be combined in a memory (e.g., a double data rate (DDR) memory).

Aspects of the present disclosure may include a number of benefits or advantages. For instance, aspects of the present disclosure may reduce GPU composition time, which may provide more time for content rendering. Aspects presented herein may also save memory bandwidth at a GPU and/or a DPU, as well as increase the overall performance at a GPU and/or a DPU. Further, aspects presented herein may be fully compatible with an existing augmented reality (AR) data flow. Aspects of the present disclosure may also utilize existing hardware that is part of the DPU, which may otherwise not be used in a field sequential display configuration. Moreover, aspects presented herein may include scalable aspects, where different options may depend on different factors (e.g., chip tier, panel resolution, and/or framerate).

Figure 8:
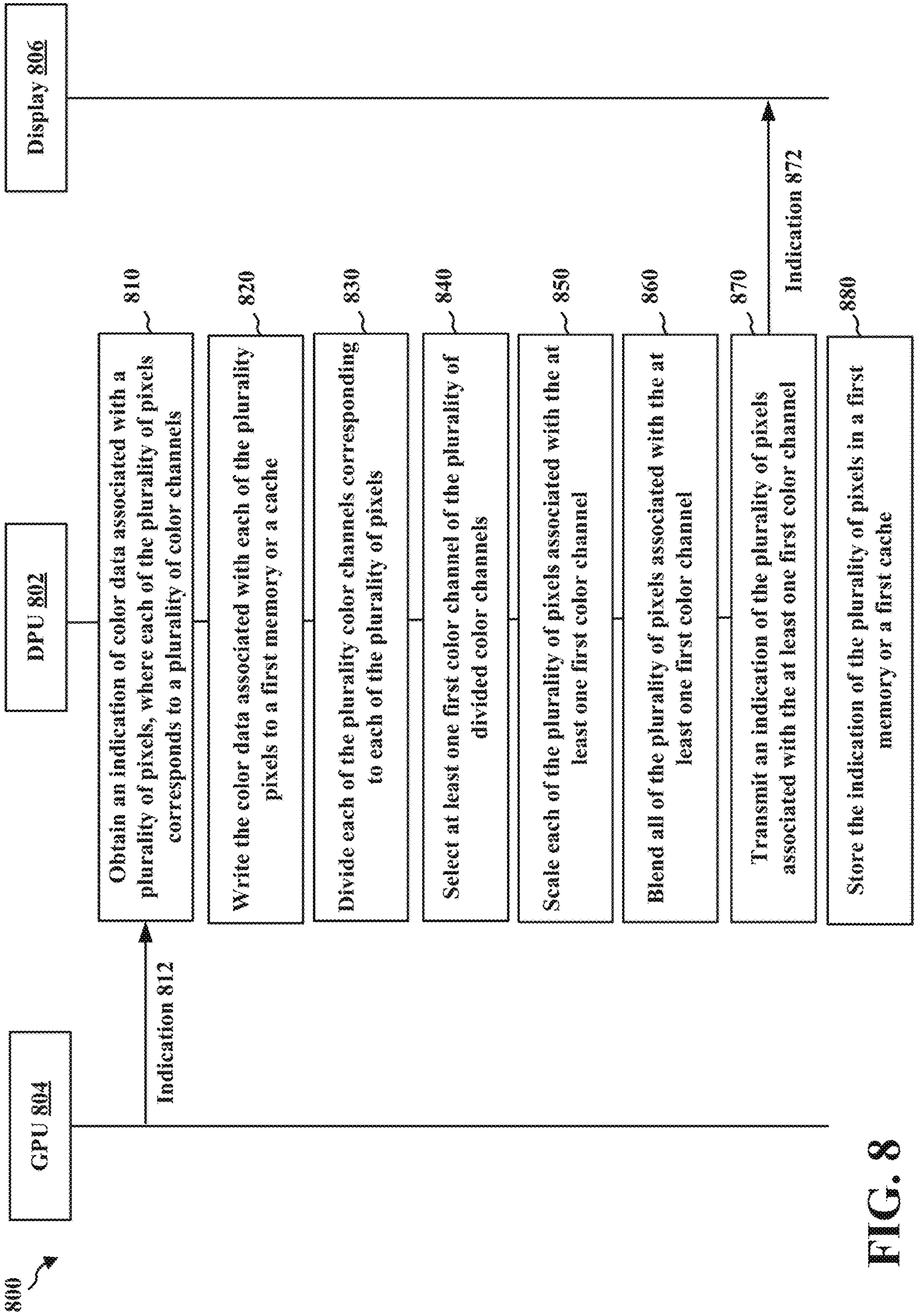
FIG. 8 is a communication flow diagram illustrating example communications between a GPU, a DPU, and a display.

FIG. 8 is a communication flow diagram 800 of display processing in accordance with one or more techniques of this disclosure. As shown in FIG. 8, diagram 800 includes example communications between DPU 802 (or other display processor), GPU 804 (e.g., a GPU buffer or GPU memory), and display 806 (e.g., a display panel), in accordance with one or more techniques of this disclosure.

At 810, DPU 802 may obtain an indication of color data associated with a plurality of pixels (e.g., DPU 802 may obtain indication 812 from GPU 804), where each of the plurality of pixels corresponds to a plurality of color channels, where each of the plurality of pixels is associated with a corresponding pixel position of a set of pixel positions. In some aspects, the color data is interleaved color data, and obtaining the indication of the color data associated with the plurality of pixels may include: obtaining the indication of the interleaved color data associated with the plurality of pixels. In some instances, obtaining the indication of the color data may include: reading the color data from a buffer, a first memory, or a cache. The buffer may be an interleaved buffer, an eye buffer, a render buffer, a pass-through buffer, a color buffer, or a camera buffer, where reading the color data from the buffer may include: performing a memory read process on the color data. Additionally, the plurality of color channels may include a red (R) channel, a green (G) channel, a blue (B) channel, and an alpha (A) channel, where the at least one first color channel may include one or more of: the R channel, the G channel, and the B channel, and where at least one second color channel may include two or more of: the R channel, the G channel, and the B channel, where the at least one first color channel is different from the at least one second color channel.

At 820, DPU 802 may write the color data associated with each of the plurality of pixels to a first memory or a cache after being configured to obtain the indication the color data associated with each of the plurality of pixels.

At 830, DPU 802 may divide each of the plurality of color channels corresponding to each of the plurality of pixels. In some aspects, the color data is interleaved color data, and dividing each of the plurality of color channels corresponding to each of the plurality of pixels may include: adjusting each of the plurality of color channels in order to planarize the interleaved color data. Also, adjusting each of the plurality of color channels may include: packing (i.e., combining) each of the plurality of color channels in order to planarize the interleaved color data. Further, packing each of the plurality of color channels may include: packing each of the plurality of color channels with a layer mixer in a display processing unit (DPU). In some instances, dividing each of the plurality of color channels corresponding to the plurality of pixels may include: unpacking (i.e., separating) each of the plurality of color channels corresponding to the plurality of pixels.

At 840, DPU 802 may select at least one first color channel of the plurality of divided color channels. In some aspects, selecting the at least one first color channel may include: retaining the at least one first color channel, and where the DPU may also discard at least one second color channel of the plurality of color channels. Also, retaining the at least one first color channel may include: retaining the at least one first color channel based on an output format of a field sequential display (FSD). Further, discarding the at least one second color channel may include: discarding the at least one second color channel based on the output format of the FSD.

At 850, DPU 802 may scale each of the plurality of pixels associated with the at least one first color channel. In some aspects, scaling each of the plurality of pixels associated with the at least one first color channel may include: scaling each of the plurality of pixels associated with the at least one first color channel using a bilinear downscale process. The bilinear downscale process may be a 2-to-1 downscale process or a 3-to-1 downscale process. Also, scaling each of the plurality of pixels associated with the at least one first color channel may include: isolating the at least one first color channel based on a chrominance downscale process. In some aspects, scaling each of the plurality of pixels associated with the at least one first color channel may include: scaling each of the plurality of pixels associated with the at least one first color channel at a display processing unit (DPU).

At 860, DPU 802 may blend, based on each of the plurality of scaled pixels, all of the plurality of pixels associated with the at least one first color channel. In some aspects, blending all of the plurality of pixels associated with the at least one first color channel may include: blending all of the plurality of pixels of each layer in a set of layers associated with the at least one first color channel. Further, blending all of the plurality of pixels of each layer in a set of layers associated with the at least one first color channel may include: adding at least one additional layer to the set of layers, such that the set of layers includes a plurality of layers with the at least one additional layer. In some instances, blending all of the plurality of pixels associated with the at least one first color channel may include: packing all of the plurality of pixels associated with the at least one first color channel, where one or more adjacent pixels of the plurality of pixels are configured to be packed together.

At 870, DPU 802 may transmit, based on all of the plurality of blended pixels, an indication of the plurality of pixels associated with the at least one first color channel (e.g., DPU 802 may transmit indication 872 to display 806). The indication of the plurality of pixels may be transmitted to a display or a display panel.

At 880, DPU 802 may store the indication of the plurality of pixels in a first memory, a first buffer, or a first cache. For example, the DPU may store the indication of the plurality of pixels after transmitting the indication of the plurality of pixels.

Figure 9:
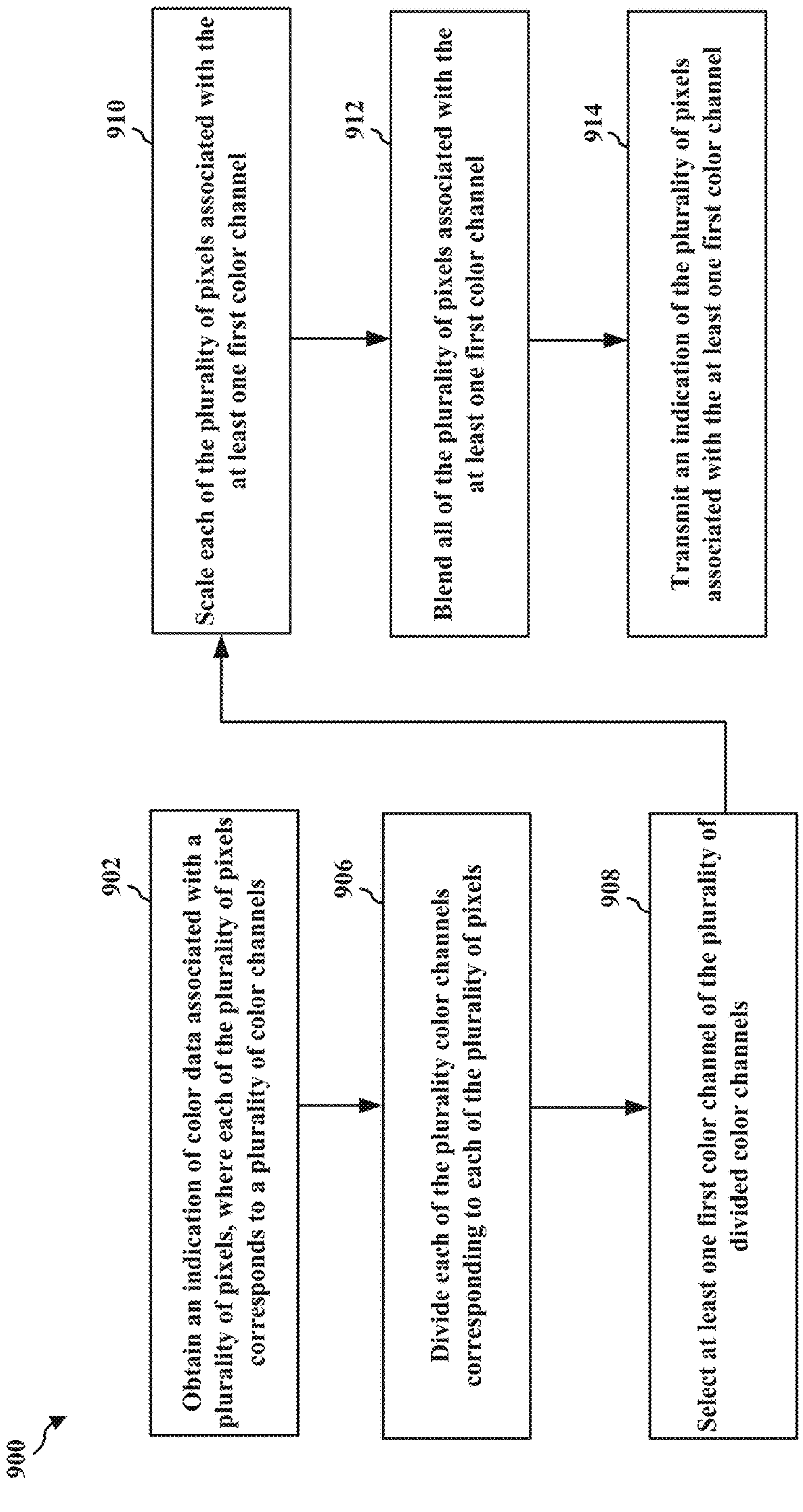
FIG. 9 is a flowchart of an example method of display processing.

FIG. 9 is a flowchart 900 of an example method of display processing in accordance with one or more techniques of this disclosure. The method may be performed by a DPU, such as an apparatus for display processing, a display processor, a wireless communication device, and/or any apparatus that may perform display processing as used in connection with the examples of FIGS. 1-8.

At 902, the DPU may obtain an indication of color data associated with a plurality of pixels, where each of the plurality of pixels corresponds to a plurality of color channels, where each of the plurality of pixels is associated with a corresponding pixel position of a set of pixel positions, as described in connection with the examples in FIGS. 1-8. For example, as described in 810 of FIG. 8, DPU 802 may obtain an indication of color data associated with a plurality of pixels, where each of the plurality of pixels corresponds to a plurality of color channels, where each of the plurality of pixels is associated with a corresponding pixel position of a set of pixel positions. Further, step 902 may be performed by display processor 127 in FIG. 1. In some aspects, the color data is interleaved color data, and obtaining the indication of the color data associated with the plurality of pixels may include: obtaining the indication of the interleaved color data associated with the plurality of pixels. In some instances, obtaining the indication of the color data may include: reading the color data from a buffer, a first memory, or a cache. The buffer may be an interleaved buffer, an eye buffer, a render buffer, a pass-through buffer, a color buffer, or a camera buffer, where reading the color data from the buffer may include: performing a memory read process on the color data. Additionally, the plurality of color channels may include a red (R) channel, a green (G) channel, a blue (B) channel, and an alpha (A) channel, where the at least one first color channel may include one or more of: the R channel, the G channel, and the B channel, and where at least one second color channel may include two or more of: the R channel, the G channel, and the B channel, where the at least one first color channel is different from the at least one second color channel.

At 906, the DPU may divide each of the plurality of color channels corresponding to each of the plurality of pixels, as described in connection with the examples in FIGS. 1-8. For example, as described in 830 of FIG. 8, DPU 802 may divide each of the plurality of color channels corresponding to each of the plurality of pixels. Further, step 906 may be performed by display processor 127 in FIG. 1. In some aspects, the color data is interleaved color data, and dividing each of the plurality of color channels corresponding to each of the plurality of pixels may include: adjusting each of the plurality of color channels in order to planarize the interleaved color data. Also, adjusting each of the plurality of color channels may include: packing each of the plurality of color channels in order to planarize the interleaved color data. Further, packing each of the plurality of color channels may include: packing each of the plurality of color channels with a layer mixer in a display processing unit (DPU). In some instances, dividing each of the plurality of color channels corresponding to the plurality of pixels may include: unpacking each of the plurality of color channels corresponding to the plurality of pixels.

At 908, the DPU may select at least one first color channel of the plurality of divided color channels, as described in connection with the examples in FIGS. 1-8. For example, as described in 840 of FIG. 8, DPU 802 may select at least one first color channel of the plurality of divided color channels. Further, step 908 may be performed by display processor 127 in FIG. 1. In some aspects, selecting the at least one first color channel may include: retaining the at least one first color channel, and where the DPU may also discard at least one second color channel of the plurality of color channels. Also, retaining the at least one first color channel may include: retaining the at least one first color channel based on an output format of a field sequential display (FSD). Further, discarding the at least one second color channel may include: discarding the at least one second color channel based on the output format of the FSD.

At 910, the DPU may scale each of the plurality of pixels associated with the at least one first color channel, as described in connection with the examples in FIGS. 1-8. For example, as described in 850 of FIG. 8, DPU 802 may scale each of the plurality of pixels associated with the at least one first color channel. Further, step 910 may be performed by display processor 127 in FIG. 1. In some aspects, scaling each of the plurality of pixels associated with the at least one first color channel may include: scaling each of the plurality of pixels associated with the at least one first color channel using a bilinear downscale process. The bilinear downscale process may be a 2-to-1 downscale process or a 3-to-1 downscale process. Also, scaling each of the plurality of pixels associated with the at least one first color channel may include: isolating the at least one first color channel based on a chrominance downscale process. In some aspects, scaling each of the plurality of pixels associated with the at least one first color channel may include: scaling each of the plurality of pixels associated with the at least one first color channel at a display processing unit (DPU).

At 912, the DPU may blend, based on each of the plurality of scaled pixels, all of the plurality of pixels associated with the at least one first color channel, as described in connection with the examples in FIGS. 1-8. For example, as described in 860 of FIG. 8, DPU 802 may blend, based on each of the plurality of scaled pixels, all of the plurality of pixels associated with the at least one first color channel. Further, step 912 may be performed by display processor 127 in FIG. 1. In some aspects, blending all of the plurality of pixels associated with the at least one first color channel may include: blending all of the plurality of pixels of each layer in a set of layers associated with the at least one first color channel. Further, blending all of the plurality of pixels of each layer in a set of layers associated with the at least one first color channel may include: adding at least one additional layer to the set of layers, such that the set of layers includes a plurality of layers with the at least one additional layer. In some instances, blending all of the plurality of pixels associated with the at least one first color channel may include: packing all of the plurality of pixels associated with the at least one first color channel, where one or more adjacent pixels of the plurality of pixels are configured to be packed together.

At 914, the DPU may transmit, based on all of the plurality of blended pixels, an indication of the plurality of pixels associated with the at least one first color channel, as described in connection with the examples in FIGS. 1-8. For example, as described in 870 of FIG. 8, DPU 802 may transmit, based on all of the plurality of blended pixels, an indication of the plurality of pixels associated with the at least one first color channel. Further, step 914 may be performed by display processor 127 in FIG. 1. The indication of the plurality of pixels may be transmitted to a display or a display panel.

Figure 10:
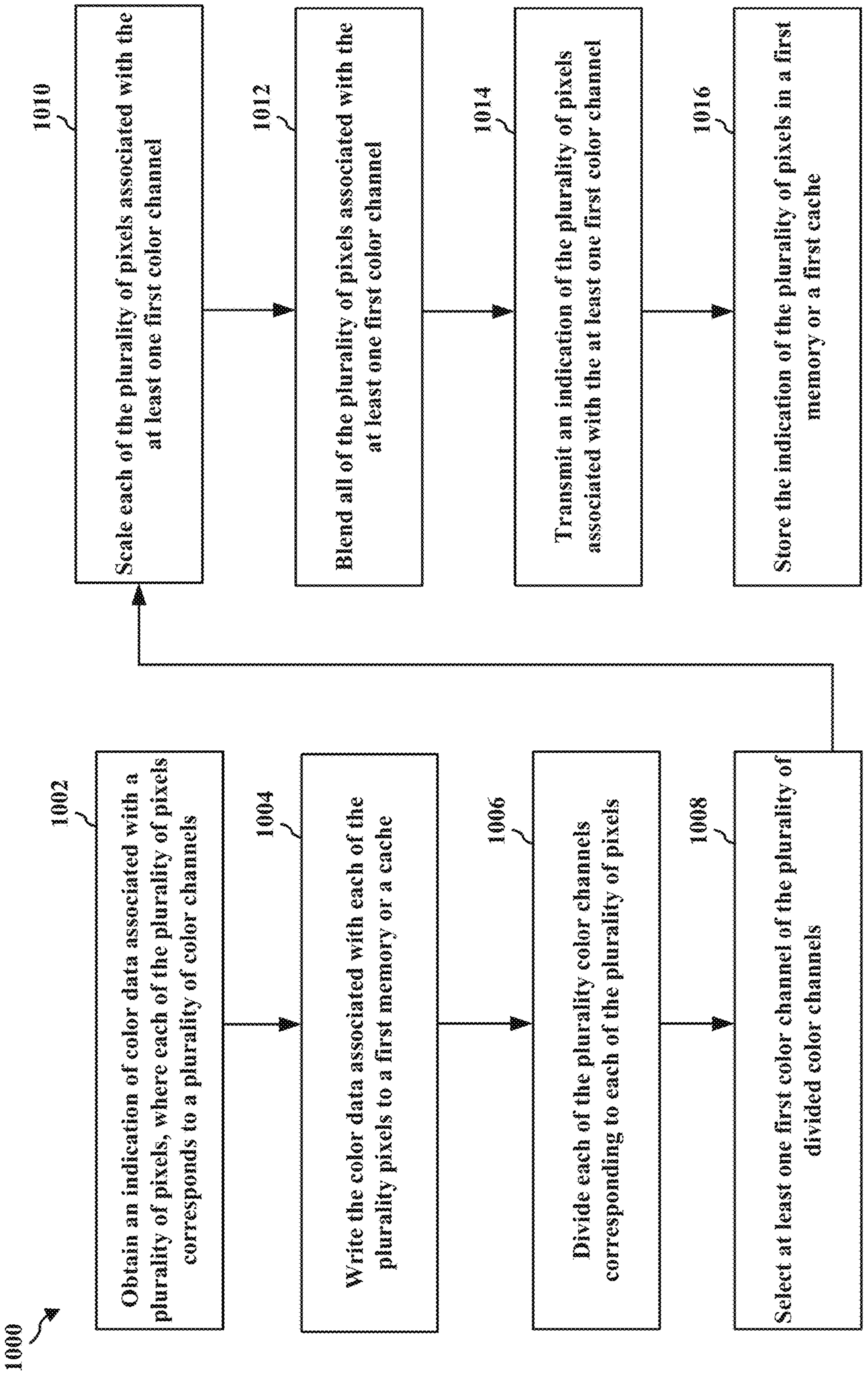
FIG. 10 is a flowchart of an example method of display processing.

FIG. 10 is a flowchart 1000 of an example method of display processing in accordance with one or more techniques of this disclosure. The method may be performed by a DPU, such as an apparatus for display processing, a display processor, a wireless communication device, and/or any apparatus that may perform display processing as used in connection with the examples of FIGS. 1-8.

At 1002, the DPU may obtain an indication of color data associated with a plurality of pixels, where each of the plurality of pixels corresponds to a plurality of color channels, where each of the plurality of pixels is associated with a corresponding pixel position of a set of pixel positions, as described in connection with the examples in FIGS. 1-8. For example, as described in 810 of FIG. 8, DPU 802 may obtain an indication of color data associated with a plurality of pixels, where each of the plurality of pixels corresponds to a plurality of color channels, where each of the plurality of pixels is associated with a corresponding pixel position of a set of pixel positions. Further, step 1002 may be performed by display processor 127 in FIG. 1. In some aspects, the color data is interleaved color data, and obtaining the indication of the color data associated with the plurality of pixels may include: obtaining the indication of the interleaved color data associated with the plurality of pixels. In some instances, obtaining the indication of the color data may include: reading the color data from a buffer, a first memory, or a cache. The buffer may be an interleaved buffer, an eye buffer, a render buffer, a pass-through buffer, a color buffer, or a camera buffer, where reading the color data from the buffer may include: performing a memory read process on the color data. Additionally, the plurality of color channels may include a red (R) channel, a green (G) channel, a blue (B) channel, and an alpha (A) channel, where the at least one first color channel may include one or more of: the R channel, the G channel, and the B channel, and where at least one second color channel may include two or more of:

the R channel, the G channel, and the B channel, where the at least one first color channel is different from the at least one second color channel.

At 1004, the DPU may write the color data associated with each of the plurality of pixels to a first memory or a cache after being configured to obtain the indication the color data associated with each of the plurality of pixels, as described in connection with the examples in FIGS. 1-8. For example, as described in 820 of FIG. 8, DPU 802 may write the color data associated with each of the plurality of pixels to a first memory or a cache after being configured to obtain the indication the color data associated with each of the plurality of pixels. Further, step 1004 may be performed by display processor 127 in FIG. 1.

At 1006, the DPU may divide each of the plurality of color channels corresponding to each of the plurality of pixels, as described in connection with the examples in FIGS. 1-8. For example, as described in 830 of FIG. 8, DPU 802 may divide each of the plurality of color channels corresponding to each of the plurality of pixels. Further, step 1006 may be performed by display processor 127 in FIG. 1. In some aspects, the color data is interleaved color data, and dividing each of the plurality of color channels corresponding to each of the plurality of pixels may include: adjusting each of the plurality of color channels in order to planarize the interleaved color data. Also, adjusting each of the plurality of color channels may include: packing each of the plurality of color channels in order to planarize the interleaved color data. Further, packing each of the plurality of color channels may include: packing each of the plurality of color channels with a layer mixer in a display processing unit (DPU). In some instances, dividing each of the plurality of color channels corresponding to the plurality of pixels may include: unpacking each of the plurality of color channels corresponding to the plurality of pixels.

At 1008, the DPU may select at least one first color channel of the plurality of divided color channels, as described in connection with the examples in FIGS. 1-8. For example, as described in 840 of FIG. 8, DPU 802 may select at least one first color channel of the plurality of divided color channels. Further, step 1008 may be performed by display processor 127 in FIG. 1. In some aspects, selecting the at least one first color channel may include: retaining the at least one first color channel, and where the DPU may also discard at least one second color channel of the plurality of color channels. Also, retaining the at least one first color channel may include: retaining the at least one first color channel based on an output format of a field sequential display (FSD). Further, discarding the at least one second color channel may include: discarding the at least one second color channel based on the output format of the FSD.

At 1010, the DPU may scale each of the plurality of pixels associated with the at least one first color channel, as described in connection with the examples in FIGS. 1-8. For example, as described in 850 of FIG. 8, DPU 802 may scale each of the plurality of pixels associated with the at least one first color channel. Further, step 1010 may be performed by display processor 127 in FIG. 1. In some aspects, scaling each of the plurality of pixels associated with the at least one first color channel may include: scaling each of the plurality of pixels associated with the at least one first color channel using a bilinear downscale process. The bilinear downscale process may be a 2-to-1 downscale process or a 3-to-1 downscale process. Also, scaling each of the plurality of pixels associated with the at least one first color channel may include: isolating the at least one first color channel based on a chrominance downscale process. In some aspects, scaling each of the plurality of pixels associated with the at least one first color channel may include: scaling each of the plurality of pixels associated with the at least one first color channel at a display processing unit (DPU).

At 1012, the DPU may blend, based on each of the plurality of scaled pixels, all of the plurality of pixels associated with the at least one first color channel, as described in connection with the examples in FIGS. 1-8. For example, as described in 860 of FIG. 8, DPU 802 may blend, based on each of the plurality of scaled pixels, all of the plurality of pixels associated with the at least one first color channel. Further, step 1012 may be performed by display processor 127 in FIG. 1. In some aspects, blending all of the plurality of pixels associated with the at least one first color channel may include: blending all of the plurality of pixels of each layer in a set of layers associated with the at least one first color channel. Further, blending all of the plurality of pixels of each layer in a set of layers associated with the at least one first color channel may include: adding at least one additional layer to the set of layers, such that the set of layers includes a plurality of layers with the at least one additional layer. In some instances, blending all of the plurality of pixels associated with the at least one first color channel may include: packing all of the plurality of pixels associated with the at least one first color channel, where one or more adjacent pixels of the plurality of pixels are configured to be packed together.

At 1014, the DPU may transmit, based on all of the plurality of blended pixels, an indication of the plurality of pixels associated with the at least one first color channel, as described in connection with the examples in FIGS. 1-8. For example, as described in 870 of FIG. 8, DPU 802 may transmit, based on all of the plurality of blended pixels, an indication of the plurality of pixels associated with the at least one first color channel. Further, step 1014 may be performed by display processor 127 in FIG. 1. The indication of the plurality of pixels may be transmitted to a display or a display panel.

At 1016, the DPU may store the indication of the plurality of pixels in a first memory, a first buffer, or a first cache, as described in connection with the examples in FIGS. 1-8. For example, as described in 880 of FIG. 8, DPU 802 may store the indication of the plurality of pixels in a first memory, a first buffer, or a first cache. Further, step 1016 may be performed by display processor 127 in FIG. 1. For example, the DPU may store the indication of the plurality of pixels after transmitting the indication of the plurality of pixels.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus, e.g., display processor 127, may include means for obtaining an indication of color data associated with a plurality of pixels, where each of the plurality of pixels corresponds to a plurality of color channels, where each of the plurality of pixels is associated with a corresponding pixel position of a set of pixel positions. The apparatus, e.g., display processor 127, may also include means for dividing each of the plurality of color channels corresponding to each of the plurality of pixels. The apparatus, e.g., display processor 127, may also include means for selecting at least one first color channel of the plurality of divided color channels. The apparatus, e.g., display processor 127, may also include means for scaling each of the plurality of pixels associated with the at least one first color channel. The apparatus, e.g., display processor 127, may also include means for blending, based on each of the plurality of scaled pixels, all of the plurality of pixels associated with the at least one first color channel. The apparatus, e.g., display processor 127, may also include means for transmitting, based on all of the plurality of blended pixels, an indication of the plurality of pixels associated with the at least one first color channel. The apparatus, e.g., display processor 127, may also include means for writing the color data associated with each of the plurality of pixels to a first memory or a cache after obtaining the indication the color data associated with each of the plurality of pixels. The apparatus, e.g., display processor 127, may also include means for storing the indication of the plurality of pixels in a first memory, a first buffer, or a first cache.

The subject matter described herein may be implemented to realize one or more benefits or advantages. For instance, the described display processing techniques may be used by a DPU, a display processor, or some other processor that may perform display processing to implement the field sequential display rendering techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize field sequential display rendering techniques in order to improve memory bandwidth efficiency and/or increase processing speed at a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing including at least one processor coupled to a memory and, based at least in part on first information stored in the memory, the at least one processor is configured to: obtain an indication of color data associated with a plurality of pixels, where each of the plurality of pixels corresponds to a plurality of color channels, where each of the plurality of pixels is associated with a corresponding pixel position of a set of pixel positions; divide each of the plurality of color channels corresponding to each of the plurality of pixels; select at least one first color channel of the plurality of divided color channels; scale each of the plurality of pixels associated with the at least one first color channel; blend, based on each of the plurality of scaled pixels, all of the plurality of pixels associated with the at least one first color channel; and transmit, based on all of the plurality of blended pixels, an indication of the plurality of pixels associated with the at least one first color channel.

Aspect 2 is the apparatus of aspect 1, where the color data is interleaved color data, where to obtain the indication of the color data associated with the plurality of pixels, the at least one processor is configured to: obtain the indication of the interleaved color data associated with the plurality of pixels, and where to divide each of the plurality of color channels corresponding to each of the plurality of pixels, the at least one processor is configured to: adjust each of the plurality of color channels in order to planarize the interleaved color data.

Aspect 3 is the apparatus of aspect 2, where to adjust each of the plurality of color channels, the at least one processor is configured to: pack each of the plurality of color channels in order to planarize the interleaved color data.

Aspect 4 is the apparatus of aspect 3, where to pack each of the plurality of color channels, the at least one processor is configured to: pack each of the plurality of color channels with a layer mixer in a display processing unit (DPU).

Aspect 5 is the apparatus of any of aspects 1 to 4, where to select the at least one first color channel, the at least one processor is configured to: retain the at least one first color channel, and where the at least one processor is further configured to: discard at least one second color channel of the plurality of color channels.

Aspect 6 is the apparatus of aspect 5, where to retain the at least one first color channel, the at least one processor is configured to: retain the at least one first color channel based on an output format of a field sequential display (FSD), and where to discard the at least one second color channel, the at least one processor is configured to: discard the at least one second color channel based on the output format of the FSD.

Aspect 7 is the apparatus of any of aspects 1 to 6, where to scale each of the plurality of pixels associated with the at least one first color channel, the at least one processor is configured to: scale each of the plurality of pixels associated with the at least one first color channel using a bilinear downscale process (e.g., a 2-to-1 downscale process or a 3-to-1 downscale process).

Aspect 8 is the apparatus of any of aspects 1 to 7, where to scale each of the plurality of pixels associated with the at least one first color channel, the at least one processor is configured to: isolate the at least one first color channel based on a chrominance downscale process.

Aspect 9 is the apparatus of any of aspects 1 to 8, where to blend all of the plurality of pixels associated with the at least one first color channel, the at least one processor is configured to: blend all of the plurality of pixels of each layer in a set of layers associated with the at least one first color channel.

Aspect 10 is the apparatus of aspect 9, where to blend all of the plurality of pixels of each layer in a set of layers associated with the at least one first color channel, the at least one processor is configured to: add at least one additional layer to the set of layers, such that the set of layers includes a plurality of layers with the at least one additional layer.

Aspect 11 is the apparatus of any of aspects 1 to 10, where to divide each of the plurality of color channels corresponding to the plurality of pixels, the at least one processor is configured to: unpack each of the plurality of color channels corresponding to the plurality of pixels.

Aspect 12 is the apparatus of any of aspects 1 to 11, where to blend all of the plurality of pixels associated with the at least one first color channel, the at least one processor is configured to: pack all of the plurality of pixels associated with the at least one first color channel, where one or more adjacent pixels of the plurality of pixels are configured to be packed together.

Aspect 13 is the apparatus of any of aspects 1 to 12, where the at least one processor is further configured to: write the color data associated with each of the plurality of pixels is to a first memory or a cache after being configured to obtain the indication the color data associated with each of the plurality of pixels.

Aspect 14 is the apparatus of any of aspects 1 to 13, where to obtain the indication of the color data, the at least one processor is configured to: read the color data from a buffer, a first memory, or a cache.

Aspect 15 is the apparatus of aspect 14, where the buffer is an interleaved buffer, an eye buffer, a render buffer, a pass-through buffer, a color buffer, or a camera buffer, where to read the color data from the buffer, the at least one processor is configured to: perform a memory read process on the color data.

Aspect 16 is the apparatus of any of aspects 1 to 15, where the plurality of color channels includes a red (R) channel, a green (G) channel, a blue (B) channel, and an alpha (A)

channel, where the at least one first color channel includes one or more of: the R channel, the G channel, and the B channel, and where at least one second color channel includes two or more of: the R channel, the G channel, and the B channel, where the at least one first color channel is different from the at least one second color channel.

Aspect 17 is the apparatus of any of aspects 1 to 16, where the at least one processor is further configured to: store the indication of the plurality of pixels in a first memory, a first buffer, or a first cache.

Aspect 18 is the apparatus of any of aspects 1 to 17, where to scale each of the plurality of pixels associated with the at least one first color channel, the at least one processor is configured to: scale each of the plurality of pixels associated with the at least one first color channel at a display processing unit (DPU).

Aspect 19 is the apparatus of any of aspects 1 to 18, further including at least one of an antenna or a transceiver coupled to the at least one processor, where to obtain the indication of the color data, the at least one processor is configured to obtain the indication of the color data via the transceiver.

Aspect 20 is a method of display processing for implementing any of aspects 1 to 19.

Aspect 21 is an apparatus for display processing including means for implementing any of aspects 1 to 19.

Aspect 22 is a computer-readable medium (e.g., non-transitory a computer-readable medium) storing computer executable code, the code when executed by at least one processor causes the at least one processor to implement any of aspects 1 to 19.

What is claimed is:

1. An apparatus for display processing, comprising:
memory; and
at least one processor coupled to the memory and, based at least in part on first information stored in the memory, the at least one processor is configured to:
obtain an indication of color data associated with a plurality of pixels, wherein each of the plurality of pixels corresponds to a plurality of color channels, wherein each of the plurality of pixels is associated with a corresponding pixel position of a set of pixel positions;
divide the color data into each of the plurality of color channels corresponding to each of the plurality of pixels;
select at least one first color channel of the plurality of color channels;
scale each of the plurality of pixels associated with the at least one first color channel;
blend all of the plurality of pixels of each layer in a set of layers associated with the at least one first color channel; and
transmit an indication of the plurality of blended pixels associated with the at least one first color channel.

2. The apparatus of claim 1, wherein the color data is interleaved color data, wherein to obtain the indication of the color data associated with the plurality of pixels, the at least one processor is configured to: obtain the indication of the interleaved color data associated with the plurality of pixels;
wherein to divide each of the plurality of color channels corresponding to each of the plurality of pixels, the at least one processor is configured to: adjust each of the plurality of color channels in order to planarize the interleaved color data.

3. The apparatus of claim 2, wherein to adjust each of the plurality of color channels, the at least one processor is configured to: pack each of the plurality of color channels in order to planarize the interleaved color data.

4. The apparatus of claim 3, wherein to pack each of the plurality of color channels, the at least one processor is configured to: pack each of the plurality of color channels with a layer mixer in a display processing unit (DPU).

5. The apparatus of claim 1, wherein to select the at least one first color channel, the at least one processor is configured to: retain the at least one first color channel, and wherein the at least one processor is further configured to: discard at least one second color channel of the plurality of color channels.

6. The apparatus of claim 5, wherein to retain the at least one first color channel, the at least one processor is configured to: retain the at least one first color channel based on an output format of a field sequential display (FSD);
wherein to discard the at least one second color channel, the at least one processor is configured to: discard the at least one second color channel based on the output format of the FSD.

7. The apparatus of claim 1, wherein to scale each of the plurality of pixels associated with the at least one first color channel, the at least one processor is configured to: scale each of the plurality of pixels associated with the at least one first color channel using a bilinear downscale process.

8. The apparatus of claim 1, wherein to scale each of the plurality of pixels associated with the at least one first color channel, the at least one processor is configured to: isolate the at least one first color channel based on a chrominance downscale process.

9. The apparatus of claim 1, wherein to blend all of the plurality of pixels of each layer in the set of layers associated with the at least one first color channel, the at least one processor is configured to: add at least one additional layer to the set of layers, such that the set of layers includes a plurality of layers with the at least one additional layer.

10. The apparatus of claim 1, wherein to divide each of the plurality of color channels corresponding to the plurality of pixels, the at least one processor is configured to: unpack each of the plurality of color channels corresponding to the plurality of pixels.

11. The apparatus of claim 1, wherein to blend all of the plurality of pixels associated with the at least one first color channel, the at least one processor is configured to: pack all of the plurality of pixels associated with the at least one first color channel, wherein one or more adjacent pixels of the plurality of pixels are configured to be packed together.

12. The apparatus of claim 1, wherein the at least one processor is further configured to:
write the color data associated with each of the plurality of pixels to a first memory after being configured to obtain the indication the color data associated with each of the plurality of pixels.

13. The apparatus of claim 1, wherein to obtain the indication of the color data, the at least one processor is configured to: read the color data from a buffer, a first memory, or a cache.

14. The apparatus of claim 13, wherein the buffer is an interleaved buffer, an eye buffer, a render buffer, a pass-through buffer, a color buffer, or a camera buffer, wherein to read the color data from the buffer, the at least one processor is configured to: perform a memory read process on the color data.

15. The apparatus of claim 1, wherein the plurality of color channels includes a red (R) channel, a green (G) channel, a blue (B) channel, and an alpha (A) channel, wherein the at least one first color channel includes one or more of: the R channel, the G channel, and the B channel, and wherein at least one second color channel includes two or more of: the R channel, the G channel, and the B channel, wherein the at least one first color channel is different from the at least one second color channel.

16. The apparatus of claim 1, wherein the at least one processor is further configured to:

store the indication of the plurality of pixels in a first memory, a first buffer, or a first cache.

17. The apparatus of claim 1, further comprising a transceiver coupled to the at least one processor, wherein to obtain the indication of the color data, the at least one processor is configured to obtain the indication of the color data via the transceiver, and wherein to scale each of the plurality of pixels associated with the at least one first color channel, the at least one processor is configured to: scale each of the plurality of pixels associated with the at least one first color channel at a display processing unit (DPU).

18. A method of display processing, comprising:

obtaining an indication of color data associated with a plurality of pixels, wherein each of the plurality of pixels corresponds to a plurality of color channels, wherein each of the plurality of pixels is associated with a corresponding pixel position of a set of pixel positions;

dividing the color data into each of the plurality of color channels corresponding to each of the plurality of pixels;

selecting at least one first color channel of the plurality of divided color channels;

scaling each of the plurality of pixels associated with the at least one first color channel;

blending all of the plurality of pixels of each layer in a set of layers associated with the at least one first color channel; and transmitting an indication of the plurality of blended pixels associated with the at least one first color channel.

19. The method of claim 18, wherein the color data is interleaved color data, wherein obtaining the indication of the color data associated with the plurality of pixels comprises:

obtaining the indication of the interleaved color data associated with the plurality of pixels;

wherein dividing each of the plurality of color channels corresponding to each of the plurality of pixels comprises: adjusting each of the plurality of color channels in order to planarize the interleaved color data.

20. The method of claim 19, wherein adjusting each of the plurality of color channels comprises: packing each of the plurality of color channels in order to planarize the interleaved color data.

21. The method of claim 20, wherein packing each of the plurality of color channels comprises: packing each of the plurality of color channels with a layer mixer in a display processing unit (DPU).

22. The method of claim 18, wherein selecting the at least one first color channel comprises: retaining the at least one first color channel, and the method further comprising: discarding at least one second color channel of the plurality of color channels.

23. The method of claim 22, wherein retaining the at least one first color channel comprises: retaining the at least one first color channel based on an output format of a field sequential display (FSD);

wherein discarding the at least one second color channel comprises: discarding the at least one second color channel based on the output format of the FSD.

24. The method of claim 18, wherein scaling each of the plurality of pixels associated with the at least one first color channel comprising: scaling each of the plurality of pixels associated with the at least one first color channel using a bilinear downscale process.

25. The method of claim 18, wherein scaling each of the plurality of pixels associated with the at least one first color channel comprises: isolating the at least one first color channel based on a chrominance downscale process.

26. The method of claim 18, wherein blending all of the plurality of pixels of each layer in the set of layers associated with the at least one first color channel comprises: adding at least one additional layer to the set of layers, such that the set of layers includes a plurality of layers with the at least one additional layer.

27. The method of claim 18, further comprising:

writing the color data associated with each of the plurality of pixels to a first memory after obtaining the indication the color data associated with each of the plurality of pixels.

28. An apparatus for display processing, comprising:

means for obtaining an indication of color data associated with a plurality of pixels, wherein each of the plurality of pixels corresponds to a plurality of color channels, wherein each of the plurality of pixels is associated with a corresponding pixel position of a set of pixel positions;

means for dividing the color data into each of the plurality of color channels corresponding to each of the plurality of pixels;

means for selecting at least one first color channel of the plurality of color channels;

means for scaling each of the plurality of pixels associated with the at least one first color channel;

means for blending all of the plurality of pixels of each layer in a set of layers associated with the at least one first color channel; and means for transmitting an indication of the plurality of blended pixels associated with the at least one first color channel.

29. A non-transitory computer-readable medium storing computer executable code for display processing, the code when executed by a processor causes the processor to:

obtain an indication of color data associated with a plurality of pixels, wherein each of the plurality of pixels corresponds to a plurality of color channels, wherein each of the plurality of pixels is associated with a corresponding pixel position of a set of pixel positions;

divide the color data into each of the plurality of color channels corresponding to each of the plurality of pixels;

select at least one first color channel of the plurality of color channels;

scale each of the plurality of pixels associated with the at least one first color channel;

blend all of the plurality of pixels of each layer in a set of layers associated with the at least one first color channel; and transmit an indication of the plurality of blended pixels associated with the at least one first color channel.

* * * * *